March 19, 1968 F. K. HOLBROOK 3,373,784
FRUIT CUTTING AND FEEDING APPARATUS
Filed Oct. 23, 1965 2 Sheets-Sheet 1

FRANKLIN K. HOLBROOK
INVENTOR.

BY Paul A. Weilein
ATTORNEY

March 19, 1968 F. K. HOLBROOK 3,373,784
FRUIT CUTTING AND FEEDING APPARATUS
Filed Oct. 23, 1965 2 Sheets-Sheet 2
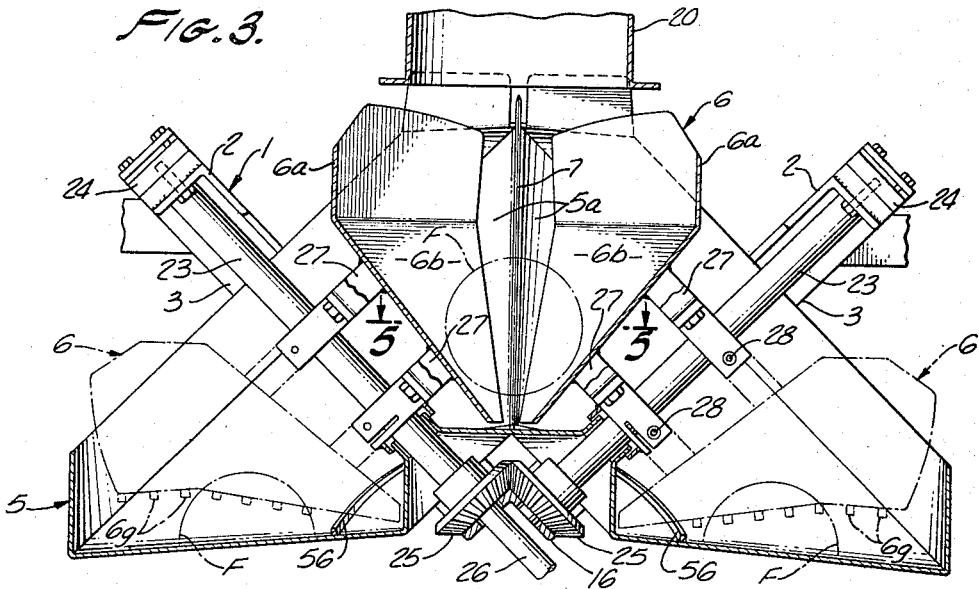
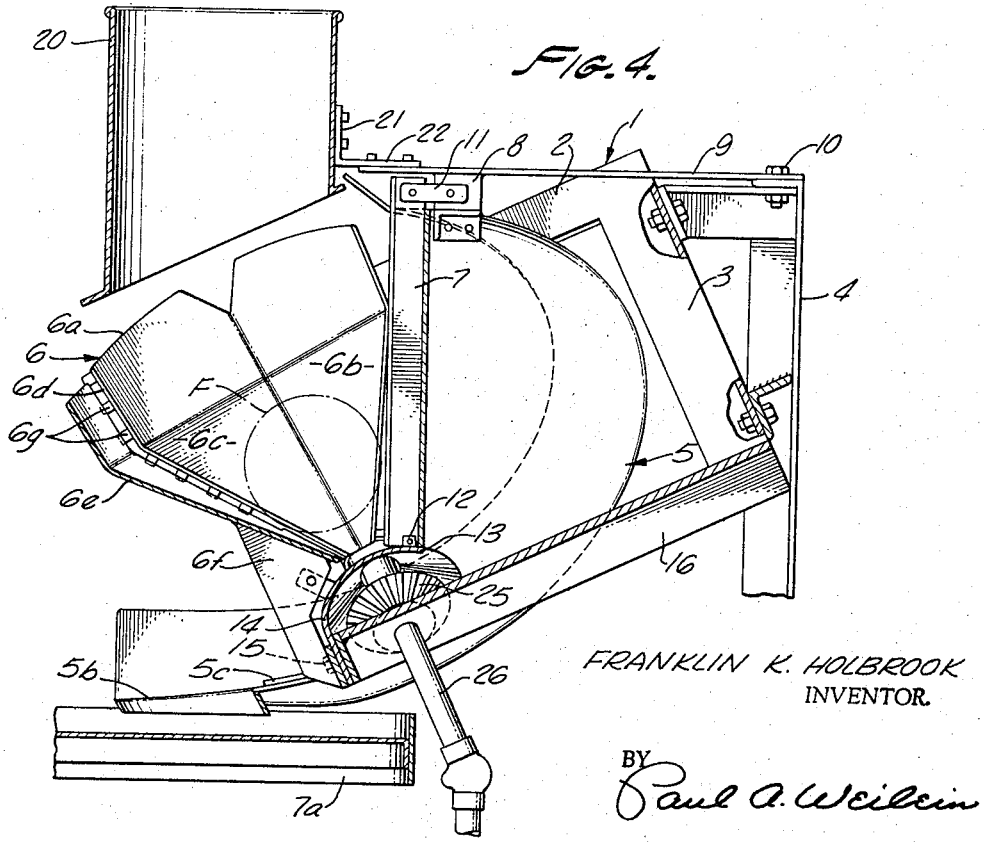
FRANKLIN K. HOLBROOK
INVENTOR.
BY Paul A. Weilein
ATTORNEY United States Patent Office 3,373,784
Patented Mar. 19, 1968

3,373,784
FRUIT CUTTING AND FEEDING APPARATUS
Franklin K. Holbrook, Whittier, Calif., assignor to Brown International Corporation, a corporation of California
Filed Oct. 23, 1965, Ser. No. 503,978
10 Claims. (Cl. 146—3)

ABSTRACT OF THE DISCLOSURE

Two cup segments cooperate at starting positions thereof to receive and confine a piece of fruit that is to be cut into halves. The two cup segments are mounted respectively on two rotary support structures that are tangential to a common plane and are rotated synchronously to move the cup segments in orbits out of their starting positions and back to their starting positions. A fixed knife blade is positioned in the tangential plane to cut the piece of fruit in half as the cup segments leave their initial positions. Two guide means concentric to the two axes of rotation of the support structures cooperate with the cup segments to captivate and transport the cup segments to a common discharge zone.

---

The present invention relates to fruit cutting and feeding apparatus and more particularly to apparatus adapted to bisect whole fruit such as citrus fruit and feed the cut fruit sections to a machine which will subsequently handle the cut fruit sections to apply juice squeezing pressure thereto.

In the use of various types of citrus fruit squeezing equipment in which pressure is applied to cut fruit halves to express the juice therefrom, it is desired that the fruit be divided substantially into equal halves irrespective of the fact that various fruit may differ in size, shape, or surface irregularities.

An object of the present invention is to provide apparatus which will receive a whole fruit and locate the same relative to a cutting knife in such a relation to the cutting knife that the fruit will be divided into equal halves when forced over the knife.

More particularly, an object of the invention is to provide apparatus which will effectively center cut fruit relative to a cutting knife irrespective to variations in the fruit and in which the means for centering the fruit acts to force the fruit past the cutting knife and then cause the fruit to be fed to a location at which it may be otherwise handled and/or treated in a juice squeezing machine.

In determining the value of a load of citrus fruit from which juice is to be extracted, a sample of the load is squeezed in citrus juice extraction apparatus which is preferably so constructed as to be uniform in its operation in respect of the pressure applied to cut fruit sections and the period of the applied pressure. An object of the present invention is to provide fruit cutting or bisecting means to divide whole fruit into equal half sections so that regardless of variations in the sample fruit, each fruit is divided the same as the other fruit of the sample group and, therefore, uniformity of sampling will be enhanced.

In accomplishing the foregoing objectives, the present invention contemplates the provision of a downwardly tapering fruit receiver adjacent a cutting knife and adapted to receive a whole fruit between opposed receiver walls which will centralize the fruit relative to the knife and thereafter certain of the receiver walls will be moved towards the knife to force the centered whole fruit past the knife thereby dividing the same into equal half sections.

Other objects and advantages of the invention will be hereinafter described or will become apparent to those skilled in the art, and the novel features of the invention will be defined in the appended claims.

In the accompanying drawings:

FIG. 3 is a substantially vertical sectional view as taken on the line 3—3 of FIG. 2, certain of the parts being shown in elevation;

FIG. 4 is a view in vertical section as taken on the line 4—4 of FIG. 1 and on a slightly enlarged scale.

Like reference characters in the several views of the drawings and in the following description designate corresponding parts.

Figure 1:
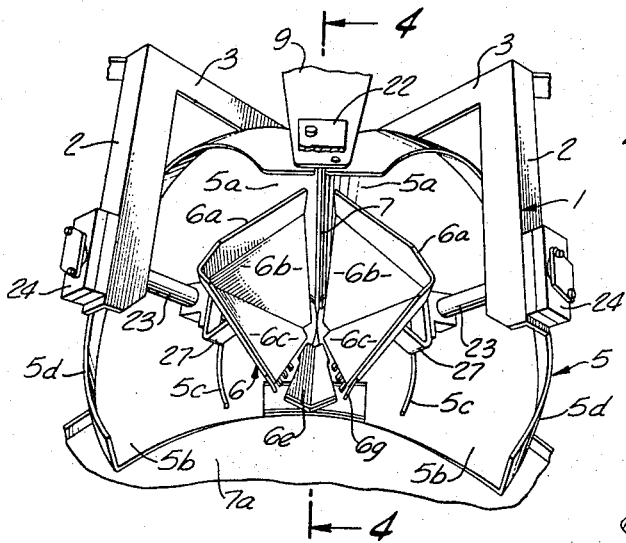
FIG. 1 is a top plan view of a fruit cutting and feeding apparatus made in accordance with the invention.

The fruit cutting and feeding apparatus of the invention comprises a supporting frame 1 including a pair of inclined support arms 2, 2 disposed in substantially parallel spaced relation and connected at one end on divergent sections 3, 3 which are in turn mounted on suitable supporting structure 4.

Disposed beneath the arms 2 of the supporting frame is a fruit section receiving and delivery chute generally denoted at 5 to which cut fruit sections are fed by fruit centering means generally denoted at 6 after the fruit has been forced by such fruit centering means past a knife 7. The fruit sections are delivered from the chute 5 to a suitable table 7a which may be a table of a suitable machine for expressing juice from the cut fruit sections delivered thereto such as for example a machine embodying rotary pressure applying heads as disclosed in U.S. Patent No. 3,185,071 or in U.S. Patent No. 3,185,072.

Figure 5:
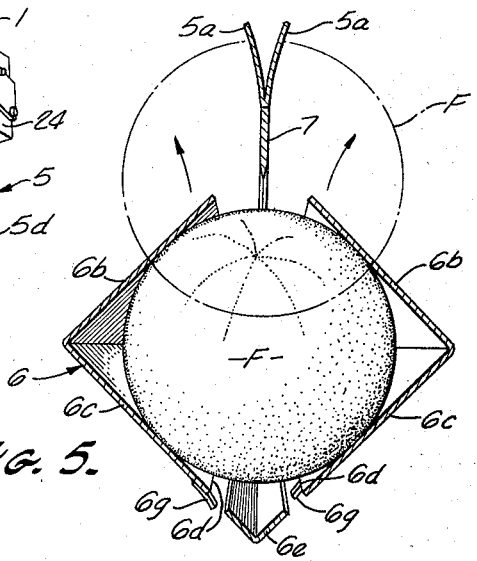
FIG. 5 is a fragmentary detail view in horizontal section as taken on the line 5—5 of FIG. 3.
Figure 2:
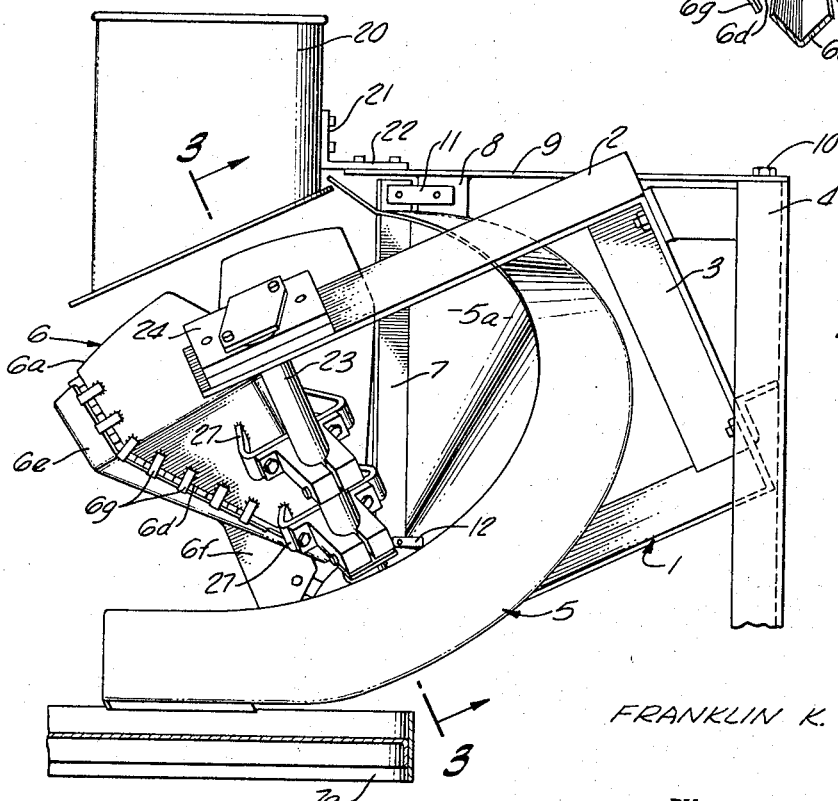
FIG. 2 is a view in side elevation of the apparatus of FIG. 1 and on a slightly enlarged scale.

The chute means generally denoted at 5 includes a pair of guide means in the form of arcuately diverging walls 5a, 5a leading from the knife 7 as best seen in FIG. 5, and fanning arcuately away from one another and progressively turning downwardly and thence converging towards each other substantially horizontally to provide discharge portions 5b from which fruit half sections will pass into a common discharge zone on the table 7a. The chute is preferably composed of suitable sheet material and is supported at its upper end by a bracket 8 carried by a support plate 9 which in turn is supported as by fasteners 10 on the supporting structure 4.

The knife 7 is also supported at its upper end on the bracket 8 by means of a connector member 11 while at its lower end the knife 7 is connected at 12 to a portion 13 of the chute 5 which extends upwardly and inwardly from a wall 14 of the chute, this wall 14 being formed centrally of the chute between the discharge sections 5b, 5b and being connected as by a fastener 15 to an angle iron support 16 carried by the support structure 4.

The fruit centering means 6 as generally referred to above and which also constitutes means for forcing a whole fruit past the knife 7 is disposed centrally of the chute 5 between the discharge sections 5b, 5b and includes complemental components which in the specifically illustrated embodiment provide a downwardly convergent tetrahedron.

More particularly, the fruit centering means comprises a pair of opposing cup-like members or cup segments 6a, 6a mounted in a manner which will hereinafter be described so as to have adjacent walls 6b of generally triangular form disposed at opposite sides of the knife 7 in slightly spaced relation and flared outwardly or diverging towards the top theerof. Joined to each of the walls 6b in substantially right angular relation thereto is a similar wall 6c, the walls 6c being opposed to one another and also flaring outwardly or diverging towards their top.

As seen in FIG. 5, the walls 6b and 6c are adapted to centralize a generally spherical fruit denoted at F by linear contact with the fruit in diametrically opposed locations on walls 6b and 6c so that the fruit is virtually centralized within and between the opposing cup-like members 6a, the walls of which form at a tetrahedron. The walls 6c of the cup-like members have free edges 6d, 6d disposed in spaced relation and in the space between such edges is an angular baffle or third cup segment 6e carried by a bracket 6f mounted by the fastener 15 described above to the angle iron 16 as seen in FIG. 4. The baffle 6e flares upwardly to substantially occupy the space between the edges 6d of cup walls 6c and so as to cooperate with the cup-like members to complete the formation of the downwardly converging centering means which, due to the flaring mouth thereof, is adapted to receive fruit of various sizes which may be deposited therein and will gravitationally seek a position as shown in FIG. 5 centralized between the walls 6b and 6c.

Means are provided wherein fruit are directed or fed into the centering means 6 through a guide tube 20. This guide tube is mounted upon a bracket 21 connected as at 22 to the plate 9 so as to be substantially in overlying relation to the open mouth of the centering means.

Each of the cup-like sections 6a of the centering means is carried by a corresponding rotary support structure on a corresponding shaft 23. One end of each shaft 23 is journalled in a bearing block 24 carried by one of the support arms 2. Shafts 23 are disposed at angles which intersect at the lower ends of the shafts 23 and as best seen in FIG. 3 the lower ends of the respective shafts are provided with co-engaged bevelled gears 25, 25 which are respectively journalled in the angle iron 16. A drive shaft 26 is engaged with one of the bevelled gears so as to impart rotation to one of the shafts 23 while the bevelled gears will effect opposite rotation of the other shaft 23.

For movement of the cup segments or sections 6a synchronously in closed paths out of starting positions and back to starting positions, the cup segments are connected to the shafts 23 as by means of supporting brackets 27, 27 suitably connected to the respective cup-like sections and clamped to the respective shafts 23 as by clamping screws 28. Thus, synchronous rotation of the drive shaft 26 will effect synchronous movement of the cup sections, as shown by the arrows in FIG. 5, in opposite directions so that the walls 6c will engage the fruit F forcing the same towards the knife 7. It will be noted that the knife 7 is in a plane that is generally tangential of the two rotary support structures and that the two shafts or axes of the two rotary support structures are symmetrical relative to the plane and at acute angles relative to the plane. It will be understood that continued rotation of the cup-like section 6a following division of the fruit F will result in movement of the edges 6d of walls 6c of the respective cups arcuately away from one another. Therefore, the previously described walls 5a of the chute means 5 are preferably disposed on a curve generally corresponding to the arc travelled by the edges 6d of the cup sections 6a. Thus, not only do the walls 6c of the cup sections 6a force the fruit past the knife 7, but these walls also remain in engagement with the fruit sections to assure their continued travel along the chute walls 5a to the discharge sections 5b of the chute.

In order to maintain the cut fruit sections within paths on the chute walls 5a and 5b which are traversed by the edges 6d of the cup-like members, such chute walls may be provided with baffles 5c, 5c which extend along the walls 5a and 5b in substantial parallelism with the outer marginal walls 5d, 5d. Both baffles 5c and marginal walls 5d are spaced so as to be at opposite sides of the path of arcuate travel of the cup-like members.

To assure positive displacement of the cut fruit sections, the edges 6d of the cup-like sections 6a may be provided with a plurality of push fingers 6g along the edges 6d which, during the initial arcuate movement of the cup-like sections 6a, will interdigitate but which during subsequent movement of the cup-like sections may closely follow the contour of the chute walls 5a and discharge sections 5b. Furthermore, the fingers 6g will be seen in FIG. 3 to assure that the fruit will be positively displaced from the discharge sections 5b of the chute even though the edges 6d of the cup-like sections 6a, as shown in broken lines in FIG. 3, may have commenced to ascend in their arcuate motion so as to be moving away from the discharge fruit sections 5b.

Preferably, it will be understood that the centering means 6 and more particularly the respective cup-like sections 6a thereof will be caused to revolve cyclically, i.e., to effect one cycle of operation involving revolution of the shafts 23 360° at intermittent intervals so that in the intervening dwell a fruit may be manually or otherwise placed in the guide tube 20 and gravitate to the centering means.

In addition, as viewed in FIG. 4, the relationship of the walls 6b of the centering means to the knife 7 in the dwell position, best seen in FIGS. 1 and 4, is such that a fruit deposited into the centering means will be held centered between the opposing walls thereof but will not engage the knife 7. Thus, the knife cannot interfere with proper uniform centering of the respective fruit as they are placed into the centering means, no matter what may be the size of the fruit, ranging between the smallest fruit which will gravitate to the lower region of the centering means, and the largest fruit which will be centered at the upper end or mouth of the centering means. In this connection, it will also be noted that the centering means are disposed on an inclined axis generally corresponding to the inclination of the shafts 23 so as to assure that the fruit will gravitationally remain spaced from the knife 7 while being centered solely by contact with walls 6b and 6c of the cup-like members.

From the foregoing it will now be apparent that the present invention provides a novel means for centering fruit with respect to a knife and thereafter pushing the fruit past the knife to divide the same into equal half sections and delivering the same along the chute from which the fruit sections are ultimately discharged, and that the action of the centering means will be the same with respect to each successive fruit, notwithstanding variations in the fruit size or shape, so long as the fruit is essentially spherical, i.e., so long as the fruit is essentially shaped as are the predominance of oranges and grapefruit. It will also be understood that the invention is not necessarily limited to use in the dividing of such citrus fruit but, indeed, may be employed in dividing into equal half sections any substantially spherical article.

While specific structural details have been shown and described, it should be understood that changes and alterations may be resorted to without departing from the spirit of the invention as defined in the appended claims.

I claim:

1. Apparatus for cutting fruit and like articles, comprising:

a support structure;
   a knife mounted on said support structure;
   chute means including walls leading from opposite sides of said knife and extending arcuately therefrom, said said walls and to said discharge sections,
   said walls leading to said discharge sections; and
   means also carried by said support structure adjacent said knife for receiving and centering whole fruit relative to said knife and for pushing said whole fruit past said knife to divide said whole fruit into equal half sections and moving said fruit half sections onto said walls and to said discharge sections,
   said means for receiving and centering whole fruit comprising:
      a pair of downwardly convergent cup-like members disposed in opposing relation at opposite sides of said knife and having angularly related walls for engaging said whole fruit in a plurality of angularly spaced locations, each of said cup-like members having adjacent side walls remote from said knife disposed with their opposing edges in spaced relation; and a baffle carried by said support structure interposed between said spaced edges.

2. Apparatus for cutting fruit and like articles, comprising:

a support structure;

a knife mounted on said support structure;

chute means including walls leading from opposite sides of said knife and extending arcuately therefrom, said chute means also having discharge sections, said walls leading to said discharge sections; and means also carried by said support structure adjacent said knife for receiving and centering whole fruit relative to said knife and for pushing said whole fruit past said knife to divide said whole fruit into equal half sections and moving said fruit half sections onto said walls and to said discharge sections, said means for receiving and centering whole fruit comprising:

a pair of downwardly convergent cup-like members disposed in opposing relation at opposite sides of said knife and having angularly related walls for engaging said whole fruit in a plurality of angularly spaced locations, each of said cup-like members having adjacent side walls remote from said knife disposed with their opposing edges in spaced relation; and pusher fingers on said spaced edges constituting means for moving said fruit half sections off of said discharge sections of said chute means.

3. In an apparatus for cutting fruit and like articles, the combination of:

two cup segments cooperative at starting positions thereof in the formation of a cup to receive and confine an article that is to be cut;

means to support and move said cup segments synchronously along continuous closed paths from their starting positions and back to their starting positions with initial portions of the closed paths diverging relative to each other;

knife means between the two paths near the starting positions of the cup segments to cut an article confined by the two cup segments into two sections nested into the two cup segments, respectively; and two guide means conforming to the two closed paths, respectively, and extending from the region of the knife means to cooperate with the two cup segments, respectively, to captivate and transport the newly cut sections, respectively, and to discharge the cut sections from the cup segments before the cup segments return to their starting positions, said two guide means terminating at a common discharge zone.

4. A combination as set forth in claim 3 in which said knife means comprises a fixed blade positioned to cut an article confined by the two cup segments in response to movement of the two cup segments out of their starting positions.

5. A combination as set forth in claim 3 in which the means for moving the two cup segments in closed paths comprises two support structures having axes of rotation with the cup segments mounted on the two rotary structures and facing outwardly thereof, said two support structures being positioned in substantially tangential relationship, said two guide means being substantially concentric to said two axes, respectively.

6. A combination as set forth in claim 5 in which said cup segments have fingers positioned to extend towards the guide means to facilitate movement of the cut sections along the guide means, respectively.

7. A combination as set forth in claim 5 in which the two rotary structures are on opposite sides of a vertical plane and the axes of rotation of the two rotary structures are symmetrical relative to the plane and inclined at acute angles relative to the plane.

8. A combination as set forth in claim 7 in which the two rotary structures are of generally conical configuration and the two guide means curve downwardly to a common discharge zone.

9. A combination as set forth in claim 8 in which said two guide means converge towards the common discharge zone.

10. A combination as set forth in claim 3 which includes a third fixed cup segment to cooperate with said two cup segments to receive and confine an article at the starting positions of the two cup segments.

References Cited

UNITED STATES PATENTS

| | | |
|---|---|---|
| 2,515,749 | 7/1950 | Wallace et al. |
| 2,753,904 | 7/1956 | Trainor _____ 146—3 |
| 2,945,431 | 7/1960 | Wehr _____ 100—97 |
| 3,185,072 | 5/1965 | Rickard _____ 146—3 XR |

W. GRAYDON ABERCROMBIE, *Primary Examiner.*

UNITED STATES PATENT OFFICE
CERTIFICATE OF CORRECTION

Patent No. 3,373,784 March 19, 1968

Franklin K. Holbrook

It is certified that error appears in the above identified patent and that said Letters Patent are hereby corrected as shown below:

Column 4, line 61, cancel "said wall and to said discharge sections" and insert -- chute means also having discharge sections --.

Signed and sealed this 12th day of August 1969.

(SEAL)
Attest:

Edward M. Fletcher, Jr.
Attesting Officer

WILLIAM E. SCHUYLER, JR.
Commissioner of Patents